United States Patent [19]

Hioki

[11] 4,128,216

[45] Dec. 5, 1978

[54] SHIM FOR CASSETTE TAPES AND METHOD OF SHAPING THE SAME

[75] Inventor: Issaku Hioki, Kuwana, Japan

[73] Assignee: NTN Toyo Bearing Company Limited, Osaka, Japan

[21] Appl. No.: 589,554

[22] Filed: Jun. 23, 1975

[30] Foreign Application Priority Data

Feb. 12, 1975 [JP] Japan .................................. 50-18352

[51] Int. Cl.² ...................... G11B 23/10; G11B 15/60
[52] U.S. Cl. .................................... 242/199; 360/132
[58] Field of Search ........................... 360/132, 92–93, 360/96; 317/2 R, 2 F; 242/197–200, 55.19 A

[56] References Cited

U.S. PATENT DOCUMENTS

| 3,568,942 | 3/1971 | Cailliot ................................. 360/132 |
| 3,718,290 | 2/1973 | Wright ................................. 360/132 |
| 3,751,043 | 8/1973 | Bracci ................................. 360/132 |
| 3,826,489 | 7/1974 | Watkins, Jr. ......................... 360/132 |

OTHER PUBLICATIONS

IBM Technical Disclosure Bulletin, Owen, Reversible Endless Cassette, vol. 13, No. 11, Apr. 1971, p. 3324.

Primary Examiner—Alfred H. Eddleman
Attorney, Agent, or Firm—Hall & Houghton

[57] ABSTRACT

A retainer shim in the form of a film to be placed on each of the front and back sides of a tape when the tape is received in a cassette case composed of a body and a lid, said shim being made of a self-lubricating synthetic resin material and substantially Y-shaped to avoid waste as much as possible from the standpoint of performance by design technique. Merits and details of the construction will be made clear.

4 Claims, 9 Drawing Figures

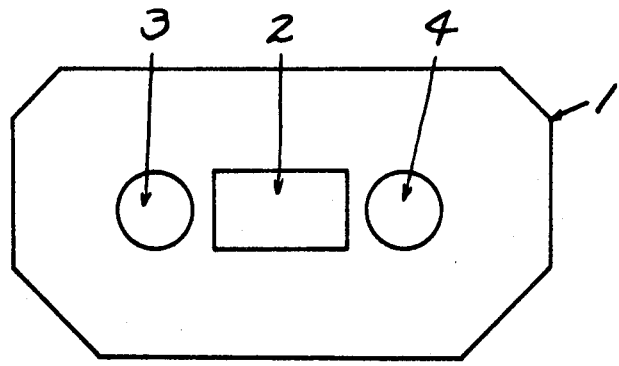
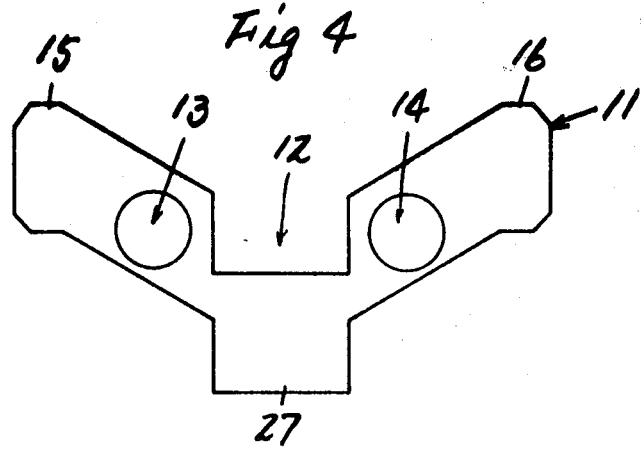

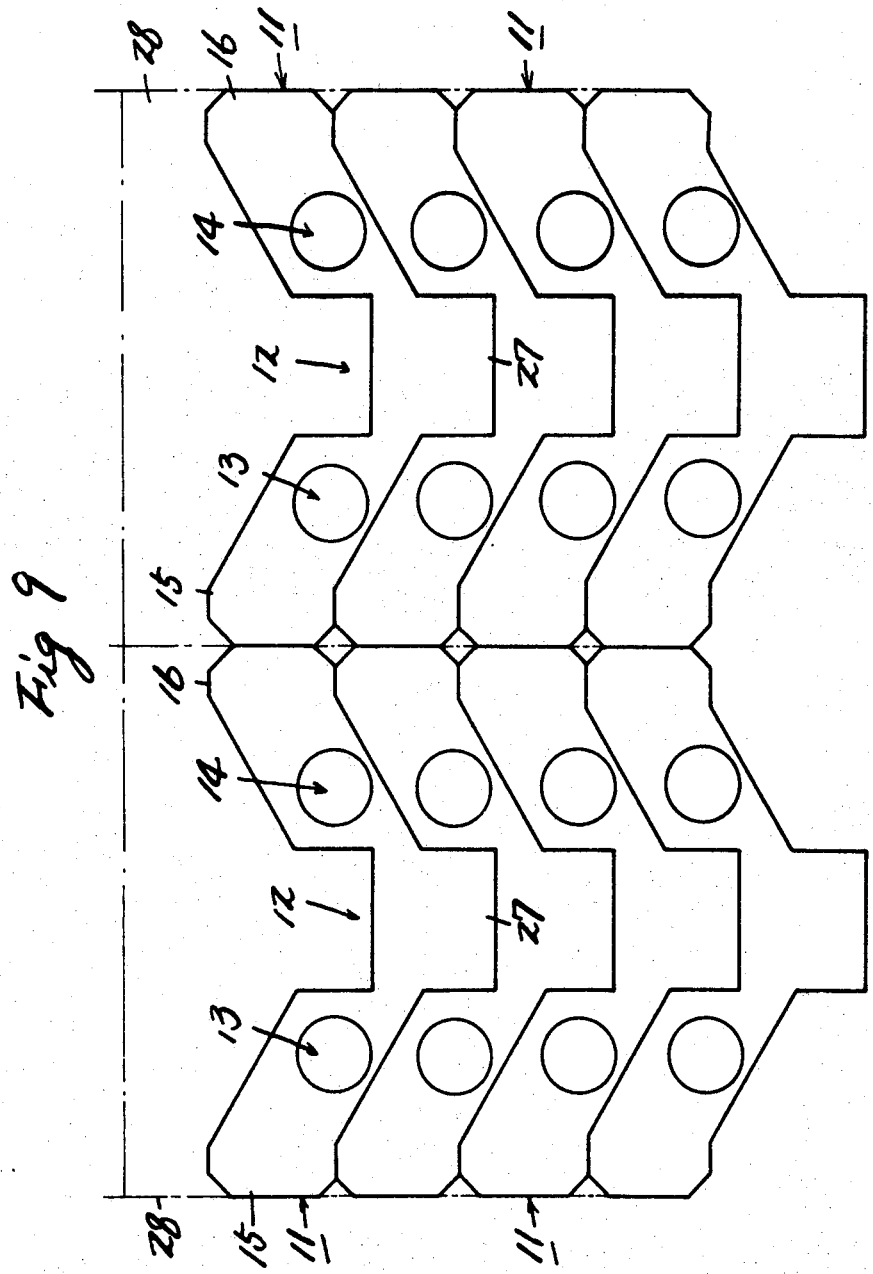

SHIM FOR CASSETTE TAPES AND METHOD OF SHAPING THE SAME

BACKGROUND OF THE INVENTION (a) Field of the Invention

The present invention relates to a shim of cassette tapes and a method of shaping the same.

(b) Description of the Prior Art

Generally, a cassette for tape recorders, as shown in FIGS. 1 and 2, is adapted to receive a tape c having two retainer sheets (shims) a and b in the form of films placed on the front and back sides thereof in a space defined by a cassette body d and a lid e.

Conventionally, said retainer sheets a and b have been made of Teflon or special paper coated with a synthetic resin material. However, the conventional retainer sheets a and b made of such materials are expensive since the material cost is high. Further, the rotation of the tape c is attended with the buildup of static electricity. The sheet material is lacking in rigidity, so that the sheets tend to bend or wrinkle, making the assembling operation inefficient.

Further, the retainer sheet (shim) for use with the cassette is generally made of a self-lubricating material and has a shape as shown in FIG. 3, punched at the center and at opposite sides of a sheet body 1 to provide a peep window 2 for watching the winding condition of the tape and two shaft apertures 3 and 4 for winding and rewinding the tape, the four corneres of the sheet body being cut away. Thus, the shim for the cassette is a sheet of synthetic resin having a thickness of the order of 0.1 mm to provide aganist the rubbing between the cassette body, tape and tape reels disposed on both sides. Conventionally, such sheet has been made of a relatively soft material, e.g., tetrafluoroethylene. However, since the material is soft as described above, the bending would be very severe adjacent the peep window unless the region above the peep window is uninterrupted, such severe bending causing inconvenience to the assembling of the cassette.

SUMMARY OF THE INVENTION

According to the present invention, from a shim for cassette tapes having a peep window at the center for watching the winding condition of the tape and two shaft apertures on both sides thereof for winding and rewinding the tape, those portions which are useless from the standpoint of performance are eliminated as much as possible by design technique, resulting in a Y-shaped configuration. More particularly, with the tape winding condition watching peep window at the center and the two tape winding and rewinding shaft apertures on both sides thereof arranged side by side, shims are cut or punched out one by one in a single row or in a plurality of rows from a ribbon- or sheet-like member made of a self-lubricating material having substantial bending rigidity. As a result, it is possible to greatly increase the yield of shims per unit area of material as compared with the shim of conventional design, so that shims can be offered at low costs. Thus, the amount of the material of the improved shim is about ½ of that of the conventional article. Further, with the upper and lower sheet edge lines of the shim made parallel to each other, by feeding a long ribbon-like blank at fixed intervals while cutting the blank by a cutter which cuts it along the upper or lower edge line and simultaneously punches out two round windows, it is possible to easily obtain the desired shims. In this case, if the feed pitch is made equal to the distance from the lower line of the tape winding condition watching window to the lower limit line of the shim, shims of the desired shape can be continuously obtained simply by the feed pitch of the press. Other advantages and details of the construction will be made clear from the following embodiments.

BRIEF DESCRIPTION OF THE DRAWING

FIG. 3 is a plan view of a known cassette tape shim;

FIG. 4 is a plan view of a cassette tape shim according to the present invention showing a typical shim configuration;

FIGS. 8 and 9 are explanatory views illustrating methods of continuously producing shims according to the present invention.

DETAILED DESCRIPTION OF THE INVENTION

Figure 1:
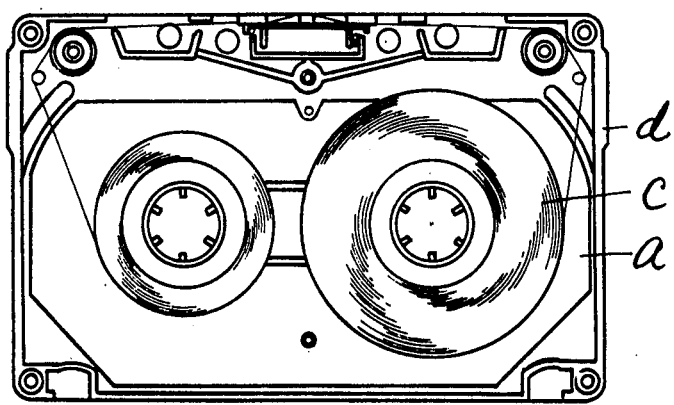
FIGS. 1 and 2 show a conventional cassette, FIG. 1 being a plan view of the cassette body having a cassette tape shim and a tape installed therein, with the lid removed, FIG. 2 being a plan view showing the inside of the lid with a cassette tape shim placed therein.
Figure 2:
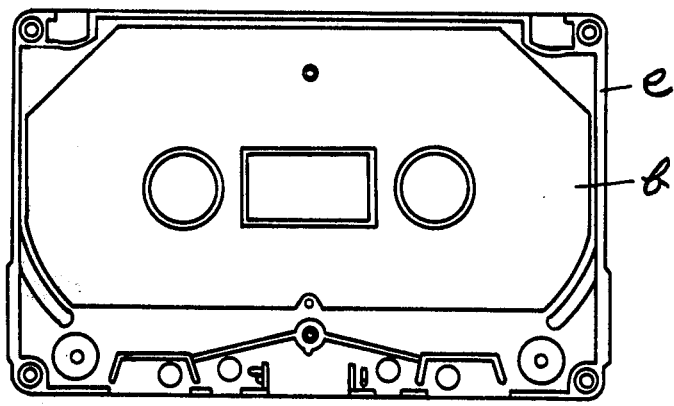
Figure 5:
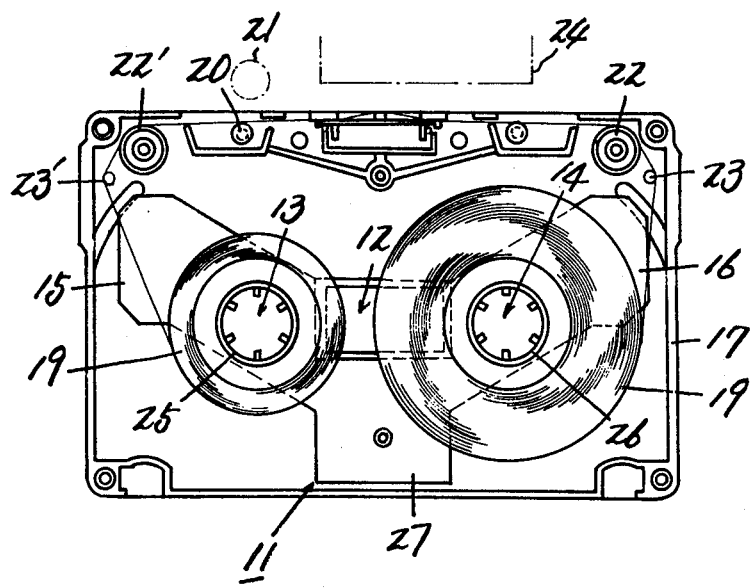
FIGS. 5 and 6 show a cassette using casstte tape shims according to the present invention, FIG. 5 being a plan view of the cassette body having a cassette tape shim and a tape installed therein, with the lid removed, FIG. 6 being a plan view showing the inside of the lid with a cassette tape shim placed therein.
Figure 6:
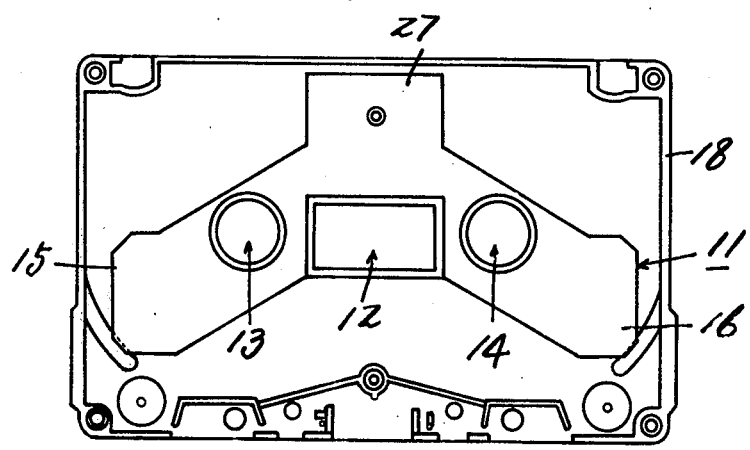

Reference is now to be had to FIG. 4, wherein a cassette shim made in accordance with the present invention is shown. As illustrated therein, the shim has a thin, one-piece sheet body or member generally designated by reference numeral 11. The thin sheet member 11 comprises a downwardly extending central leg portion 27, a pair of wing portions 15 and 16 which extend respectively outwardly and upwardly from either side of the upper end of the central leg portion 27 forming a left arm portion and a right arm portion of identical dimensions. The jointure point of the wing portions 15 and 16 with respect to one another and with respect to the upper end of the central leg portion is provided with a centrally disposed rectilinear cut-out portion 11 forming a tapewinding, condition watching peep portion for the shim. Each of the wing portions 15 and 16 is provided with shaft apertures 13 and 14 respectively for winding and rewinding a tape carried by the cassette. In FIGS. 5 and 6, 17 designates a cassette body; 18, a lid; 19, a tape; 20, a capstan; 21, a pinch roller; 22 and 22', guide rollers; 23 and 23', guide rods; and 24 designates a head section comprising recording, reproducing and erasing heads.

Figure 7:
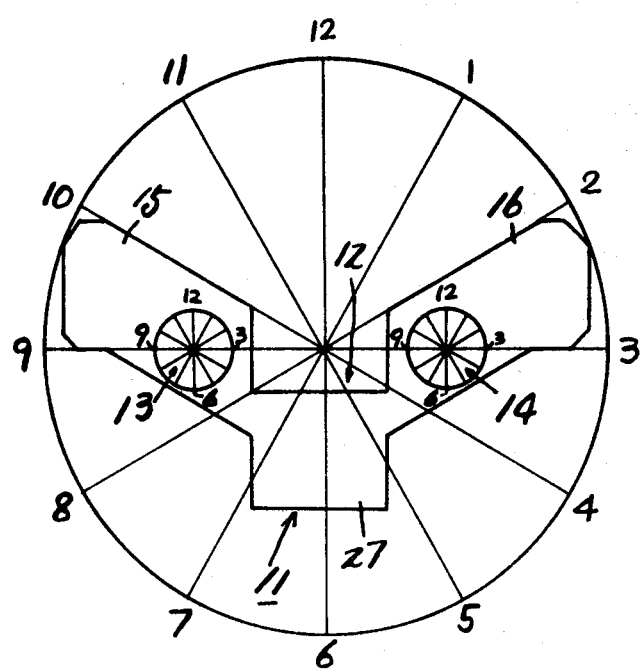
FIG. 7 shows large and small clockfaces for explaining the function and configuration of a shim according to the present invention.

The shim configuration and the functions of its various portions according to the present invention will be best understood from FIG. 7, wherein a large clockface is drawn concentrically with the tape winding condition watching peep portion and small clockfaces are drawn each concentric with one of the two shaft apertures, the figures on the clockfaces being utilized to indicate the corresponding directions.

Thus, if the 12 o'clock positions on the large and small clockfaces are positioned at top, then the tape winding condition watching peep portion is found at the center of a line connecting the 3 o'clock and 9 o'clock on the large clockface and is also found in the 9 o'clock direction as regards the right-hand side small clockface and in the 3 o'clock direction as regards the left-hand side small clockface. At the time of recording and reproducing by a tape recorder, the left-hand side shaft of the recorder drives the left-hand side tape reel 25 of the cassette to wind the tape around said tape reel 25. The tape 19 being wound is speed-controlled by the capstans 20 and pinch rollers 21. During rewinding, the pinch rollers 21 and the head section 24 are spaced apart from the capstans 20 and tape and the right-hand side tape reel 26 is driven by the right-hand side shaft of the recorder while the left-hand side tape reel 26 is driven by the tape.

The function of the shim will now be considered as to the portion thereof in contact with the tape reel which serves to take up the tape during recording or reproducing, namely the right-hand side tape reel 26. In addition, since the shim is symmetrical, the right-hand side half will be considered. Further, a view for explanation of the mechanisms inside a cassette will be omitted, since they are well known in the art. As shown in FIGS. 5 and 7, the tape on the right-hand side is guided by the guide 29 and guide roller 22 positioned between the 2 o'clock and 1 o'clock on the large clockface, passing through the head section 24 and then between the capstan 20 and pinch roller 21 and then guided by the guide roller 22' and guide rod 23' positioned between the 11 o'clock and 10 o'clock on the large clockface, until it is taken up by the left-hand side tape reel 25. Between the guide rod 23 and the right-hand side tape reel 26, opposite lateral edges of the tape are guided by the wing portions 16 positioned between the 2 o'clock and 3 o'clock on the large clockface. During winding, the tape is subjected to a tension, under which the tape is tightly wound around the right-hand side tape reel 26. The tape, once correctly introduced and tightly wound, will not become loosened since fricton forces act on the left-hand side tape reel and between the convolutions of the tape.

Opposite lateral sides of the tape portion of the tape reel between the 2 o'clock and 12 o'clock on the large clockface run in the air. During this running, there is no trouble to the operation of the recorder since there is no slack in the tape. Between the 7 o'clock and 8 o'clock on the right-hand side small clockface, opposite lateral sides of the tape run while rubbing against the leg portions 27. There is no resistance when the tape comes again in contact with the shims. The tape, which runs in contact with the leg portions 27 between the 7 o'clock and 8 o'clock on the right-hand side small clockface as described above, again leaves the shims and runs in the air between the 7 o'clock and 3 o'clock on the right-hand side small clockface, but there is no trouble during this running in the air since the tape is tightly received in the width of the right-hand side tape reel 26.

While the above description refers to the relationship between the shims and tape existing in the vicinity of the periphery of the right-hand side tape reel 26, the same may apply to the situation in the vicinity of the periphery of the left-hand side tape reel by reason of symmetry.

Next, the tape reel and the position of the center of gravity of the tape wound thereon will be considered when the cassette is operated in a horizontal position. Obviously, the center of gravity of the tape coincides with the axis of the shaft, so that even if portions of the shims are missing, there is no danger of the center of gravity being displaced and the tape reel is satisfactorily guided by the shims. When the cassette is used in a vertical position, the weights of the tape reel and tape bear on the collar of the cassette case, so that the elimination of portions of the shims will not interfere with smooth running of the tape.

Friction forces acting on the shims will be considered. The rotation of the tape reel and tape results in a force, though very small, acting on the shim surfaces, tending to turn the shims around the shaft aperture. However, since the weight of the rotary body is small and the friction coefficient is low and since the material of the shims has sufficient rigidity, said force tending to turn the shims is balanced by the reaction created in the region of contact between the outer peripheral portions of the shims and the inner periphery of the case. As a result, no rotation of the shims is caused. Of the stresses produced in the shims during the running of the tape, the compression stress therein between the 3 o'clock and 9 o'clock on the large clockface is a problem which can be solved by selecting a suitable shim material.

Methods of producing shims according to the present invention will now be described. In additon, the description of the production will be made by using FIGS. 8 and 9 and the large clockface shown in FIG. 7.

Figure 8:
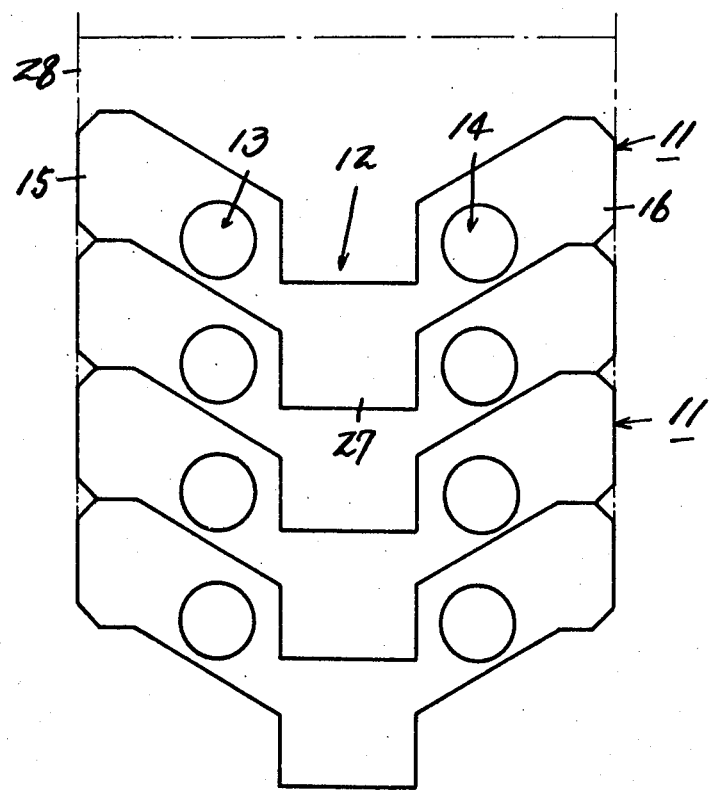

As shown in FIG. 7, shims to be produced are substantially Y-shaped each having wing portions 15 and 16 extending in the direction from the 2 o'clock to 3 o'clock and from 9 o'clock to 10 o'clock and also having a tape winding and rewinding shaft apertures 13 and 14 on both sides thereof horizontally arranged on a line connecting the 3 o'clock and 9 o'clock on the large clockface. Such shims are cut or punched out one by one in a single row from a ribbon-or sheet-like member 28 of self-lubricating material as shown in FIG. 8 or two or more at a time in a plurality of rows as shown in FIG. 9.

The self-lubricating material is produced by using ultra-high molecular weight polyethylene as the base, adding graphite or carbon thereto and molding the mixture into a thin film. As the ultra-high molecular weight polyethylene, use may be made of such materials as those sold under the trade names of Hi-zex Million and Hostalen. Such materials have substantial shock-resistance, stiffness and low friction and are very inexpensive as compared with the conventional Teflon and special paper.

If carbon or graphite is added to such material used as the base, the antifriction property and lubricating property of the graphite or carbon are incorporated in the base and the mixing of graphite or carbon increases the rigidity of the ultra-high molecular weight polyethylene, so that even if it is formed into a thin film, the latter will not exhibit warping. Further, since the addition of carbon or graphite to said base also gives an antistatic effect to ultra-high molecular weight polyethylene, which is liable to build up static electricity, the product is very suitable for use as a tape retaining sheet for tape recorders and the like.

This feature of the material is a merit in that when it is used as a synthetic resin-made lubricating member to be used where the buildup of static electricity and rubbing are likely to occur, the friction coefficient is low and the buildup of static electricity is prevented during the rotation of the tape. Further, the addition of carbon or graphite increases the rigidity and prevents the warping of the sheet (i.e., the stiffness is increased), thus facilitating the handling during the assembling of the cassette. Further, carbon and graphite are self-lubricating agents, ensuring that the tape will perform a smooth sliding movement. Therefore, the present invention is particulary useful as a tape retaining sheet for cassette tape recorders and the like, the sheet being obtained at low costs.

Whiles there have been described herein what are at present considered preferred embodiments of the several features of the invention, it will be obvious to those skilled in the art that modifications and changes may be made without departing from the essence of the invention.

It is therefore to be understood that the exemplary embodiments thereof are illustrative and not restrictive of the invention, the scope of which is defined in the appended claims and that all modifications that come within the meaning and range of equivalency of the claims are intended to be included therein.

What is claimed is:

1. A shim for cassette tapes in the form of a thin, one-piece sheet member, said sheet member comprising a downwardly extending central leg portion, a pair of substantially identical rectilinear wing portions, each being integrally secured adjacent its lower end to an upper side portion of said central leg portion, said rectilinear wing portions extending outwardly and upwardly from each side of the upper end of said central leg portion, the lateral spacing between the lower ends of said wing portions and the top edge of said central leg portion defining a rectilinear, central, cut-out portion which functions as a peep portion, said defined cut-out portion being in longitudinal alignment with and upwardly spaced from said central leg portion, and a shaft receiving aperture portion in each wing portion for receiving a shaft therein for winding and rewinding a tape carried by the cassette.

2. A shim for cassette tapes as set forth in claim 1, wherein the thin sheet member is made of a self-lubricating synthetic resin material.

3. A shim for cassette tapes as set forth in claim 2, wherein the thin sheet member has an antistatic property and substantial rigidity.

4. A shim for cassette tapes as set forth in claim 3, wherein the thin sheet member is made of ultra-high molecular weight polyethylene used as the base to which graphite or carbon is added.

* * * * *